United States Patent
Joyce

(10) Patent No.: US 9,844,180 B2
(45) Date of Patent: Dec. 19, 2017

(54) HEADER FRAME HAVING AN ADJUSTABLY MOUNTED TOOL BAR BRACKETING ASSEMBLY

(71) Applicant: CNH Industrial America LLC, New Holland, PA (US)

(72) Inventor: Joshua Steward Joyce, Lititz, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 120 days.

(21) Appl. No.: 14/883,196

(22) Filed: Oct. 14, 2015

(65) Prior Publication Data

US 2017/0105345 A1   Apr. 20, 2017

(51) Int. Cl.
| | |
|---|---|
| *A01B 59/06* | (2006.01) |
| *A01B 59/043* | (2006.01) |
| *A01B 63/02* | (2006.01) |
| *A01B 63/118* | (2006.01) |
| *A01D 41/16* | (2006.01) |
| *A01D 41/14* | (2006.01) |
| *A01D 45/02* | (2006.01) |

(52) U.S. Cl.
CPC ............ *A01D 41/16* (2013.01); *A01D 41/14* (2013.01); *A01D 45/021* (2013.01)

(58) Field of Classification Search
CPC ....... A01B 13/08; A01B 15/14; A01B 21/086; A01B 63/245; A01D 41/16; A01D 45/021; A01D 41/14
USPC ........................................................ 172/763
See application file for complete search history.

(56) References Cited

U.S. PATENT DOCUMENTS

| | | | | |
|---|---|---|---|---|
| 2,099,471 | A | * 11/1937 | Edgington | ............. A01D 65/02 56/158 |
| 2,430,434 | A | * 11/1947 | Rutter | .................. A01B 21/086 172/574 |
| 2,971,590 | A | 2/1961 | Andrews | |
| 3,520,121 | A | 7/1970 | Ashton et al. | |
| 3,982,384 | A | 9/1976 | Rohweder et al. | |
| 3,995,412 | A | 12/1976 | Gaeddert et al. | |
| 3,995,413 | A | 12/1976 | Lynch | |
| 4,203,275 | A | 5/1980 | Vermeer | |
| 4,210,212 | A | * 7/1980 | Jackson | ................. A01B 15/14 172/645 |
| 4,224,162 | A | 9/1980 | Ayroldi | |
| 4,244,162 | A | 1/1981 | Pucher | |

(Continued)

OTHER PUBLICATIONS

GTS DO Brasil, Tecnologia Além Das Medidas, pp. 1-2, published at www.gtsdobrasil.com.br.

*Primary Examiner* — Arpad Fabian-Kovacs
(74) *Attorney, Agent, or Firm* — Peter K. Zacharias; Patrick M. Sheldrake

(57) ABSTRACT

A header frame of an agricultural harvester capable of adjusting the position of attachment of a toolbar to a main frame including a main frame, first and second sides attached to respective lateral ends of the main frame, a toolbar, a brace and an adjustable bracketing assembly. The toolbar extends in a widthwise direction of the main frame. The brace includes a first end attached to the main frame and extends in a direction towards the toolbar. The adjustable bracketing assembly connects the brace to the toolbar and includes a bracket for connecting to the toolbar, and a mount attached to the brace. The bracket is attachable to the mount about a plurality of positions.

19 Claims, 8 Drawing Sheets

(56) References Cited

U.S. PATENT DOCUMENTS

| | | | | |
|---|---|---|---|---|
| 4,245,458 | A * | 1/1981 | Smith | A01D 78/001 |
| | | | | 172/314 |
| 5,743,341 | A * | 4/1998 | Wattonville | A01B 59/00 |
| | | | | 172/451 |
| 8,061,114 | B2 * | 11/2011 | Mossman | A01D 41/14 |
| | | | | 56/119 |
| 8,739,505 | B2 | 6/2014 | Koehn et al. | |
| 9,532,497 | B2 * | 1/2017 | Lohrentz | A01B 63/10 |
| 2013/0298515 | A1 * | 11/2013 | Lohrentz | A01D 47/00 |
| | | | | 56/51 |
| 2014/0360149 | A1 * | 12/2014 | Lohrentz | A01D 41/145 |
| | | | | 56/103 |

\* cited by examiner

HEADER FRAME HAVING AN ADJUSTABLY MOUNTED TOOL BAR BRACKETING ASSEMBLY

BACKGROUND OF THE INVENTION

The present invention relates generally to headers of an agricultural harvester. Specifically, the present invention relates to an improved frame of a header having an adjustable mounted toolbar bracketing assembly.

An agricultural harvester is a machine used to harvest a variety of crops from a field. During a harvesting operation e.g., of an agricultural combine equipped with a corn header, the header cuts ripened crop from the field. A feederhouse connected to the corn header transfers the crop material into the combine. Threshing and separating assemblies within the combine remove grain from the crop material and transfers the clean grain to a grain tank for temporary holding. Crop material other than grain (MOG) exits from the rear of the combine. An unloading auger transfers the clean grain from the grain tank to a truck or grain cart for transport, or to another receiving bin on or off machine for holding.

The header frame includes a toolbar, which can be used to mount a variety of farming implements to the header e.g., a row unit of a corn header. Further, the number and spacing between such row units can vary depending upon particular harvesting operational needs. However, conventional toolbars are rigidly connected i.e., typically by welding, to the main frame of the header frame. As such, owing to the fixed position of the connection between the toolbar and various components of the header frame, necessary variations in spacing and positioning of such row units can be prohibited.

Accordingly, there is still a need for a header frame of a combine harvester that is capable of adequately allowing variations in spacing and positioning of components on the toolbar. Such a need is satisfied by the header frame of an agricultural harvester of the present invention.

BRIEF SUMMARY OF THE INVENTION

In accordance with the present invention, the difficulties of improper positioning of header attachments e.g., row units on a toolbar is solved or reduced by engendering an attachment or bracketing assembly that can be adjustably positioned along a length of the toolbar. In this way, such attachment points of a toolbar to the main frame do not interfere with the desired placement of such row units along a length of the toolbar.

In accordance with a preferred embodiment, the present invention provides a header frame of an agricultural harvester that includes a main frame, first and second sides attached to respective lateral ends of the main frame, a toolbar, a brace and an adjustable bracketing assembly. The toolbar extends in a widthwise direction of the main frame. The brace includes a first end attached to the main frame and extends in a direction towards the toolbar. The adjustable bracketing assembly connects the brace to the toolbar and includes a bracket for connecting to the toolbar, and a mount attached to the brace. The bracket is attachable to the mount about a plurality of positions.

In accordance with an aspect, the present invention provides a header of an agricultural harvester that includes a clamping device that connects the toolbar to the header frame. The clamping device can be moved along the toolbar to accept different header configurations. The foregoing is advantageous since world-wide use of corn headers requires various row spacing/configurations on a given frame size. Because row unit attachment can be virtually anywhere on the toolbar (given the various configurations possible), the connection between toolbar and frame must be located in different positions depending on desired configuration. An intermediate assembly e.g., a bracket, is used between the toolbar and frame. This clamps to the toolbar and bolts to a series of holes/slots in a mount on the main frame assembly. Alternatively, a bolt-in toolbar (instead of weld-in) could also allow for more manufacturing flexibility.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the preferred embodiments of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, and ±0.1% from the specified value, as such variations are appropriate.

The terms "grain," "tailing," and "crop material" are used throughout the specification for convenience and it should be understood that these terms are not intended to be limiting. Thus, "grain" refers to that part of a crop which is harvested and separated from discardable portions of the crop material.

Figure 1:
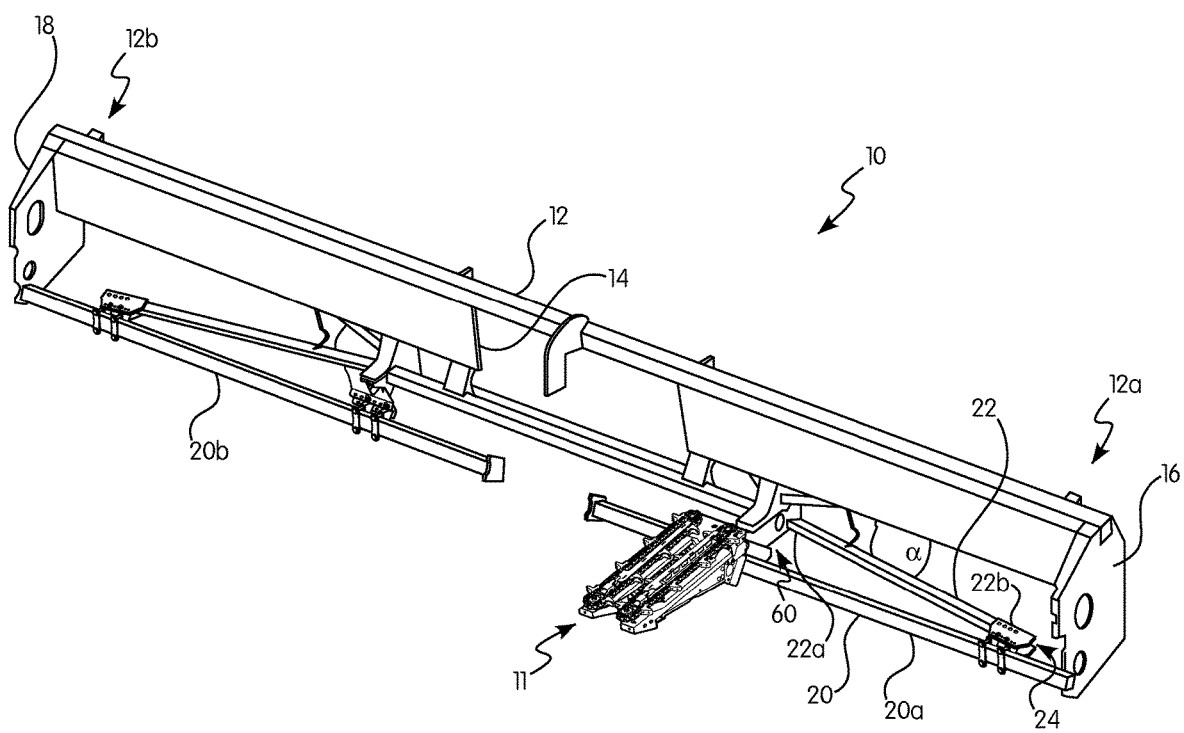
FIG. 1 is a perspective view of a header frame in accordance with a preferred embodiment of the present invention having a row unit attached to a toolbar.
Figure 2:
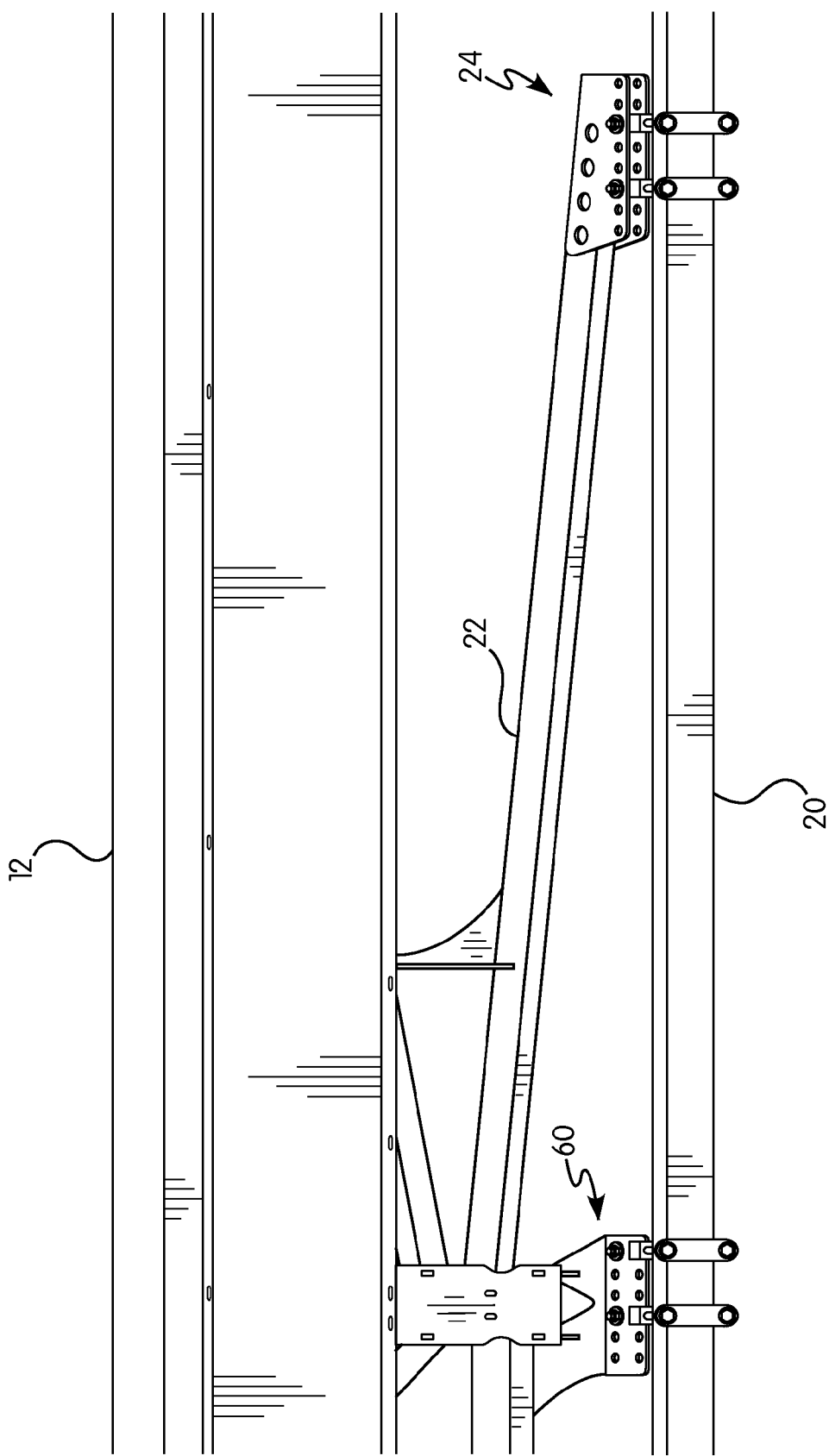
FIG. 2 is an enlarged partial front perspective view of the header frame of FIG. 1.

Referring now to the drawings, wherein preferred embodiments of the present invention are shown, FIG. 1 illustrates a header frame 10 of the present invention. For purposes of convenience, the preferred embodiments of the present invention will be described in connection with a corn header having a row unit 11. Of course, the present invention can be applied to any other header of an agricultural harvester.

The header frame 10 includes a main frame 12, first and second sides 16, 18, a toolbar 20, a brace 22, and an adjustable bracketing assembly 24. The main frame 12 has a longitudinal direction that extends in a widthwise direction of the header. Typically, the main frame 12 includes an opening for the passage of harvested crop material to a feederhouse (not shown) of the agricultural harvester.

The first side 16 extending forwardly of the main frame about a first lateral end 12a, and the second side 18 extending forwardly of the main frame about a second lateral end 12b. That is, the first and second sides 16, 18 are attached to respective lateral ends of the main frame.

The toolbar 20 is an elongated toolbar that extends in a widthwise direction of the main frame and forms the anterior section of the header frame. The toolbar 20 can be a unitary toolbar that extends between lateral ends of the main frame or between the first and second sides 16, 18. Preferably, the toolbar 20 is a segmented toolbar having a first toolbar portion 20a extending inwardly from the first lateral side 12a and a second toolbar portion 20b extending inwardly from the second lateral end 12b. More preferably, the first toolbar portion 20a is connected to and extends inwardly from the first side 16, while the second toolbar portion 20b is connected to and extends inwardly from the second side 18 and is spaced from the first toolbar portion 20a. The toolbar 20 is preferably configured as a parallelepiped bar having a substantially square longitudinal cross-section. However, the toolbar can alternatively be configured to have other shapes suitable for its intended purpose and other cross-sectional shapes e.g., triangle, rectangle and circular.

The brace 22 is a cross brace having a first end 22a attached to the main frame 12 about its mid-portion. More specifically, the first end 22a is attached to the main frame about a section spaced from a midline of the main frame and spaced from the first side 16. Preferably, the first end of the cross brace is rigidly attached to the main frame e.g., by welding, fasteners, and the like.

The brace 22 extends from the main frame towards the toolbar. As such, the brace extends from the main frame in a substantially lateral direction, such as at an acute angle α of about 10, 20, 30, 40, 50, 60 or 70 degrees relative to the main frame.

The brace 22 includes a second end 22b opposite the first end. The second end is attached to the toolbar by the adjustable bracketing assembly 24. As such, the specific point of attachment of the toolbar to the brace along a length of the toolbar 20 is adjustable.

The adjustable bracketing assembly 24, as best shown in FIGS. 3-6 includes a bracket 26 and a mount 28. The bracket 26 can be a bracket configured to slidably support the toolbar 20 and adjustably attach to the mount 28.

Preferably, the bracket 26 is configured as shown in FIGS. 2-6. The bracket 26 includes a first clamping portion 30 and a second clamping portion 32. The first clamping portion 30 is an elongated member having spaced apart apertures 34, 36 for receiving a fastener 38 therethrough. The spaced apart apertures 34, 36 are spaced apart a distance greater than a height of the toolbar 20. The apertures 34, 36 are preferably configured as through holes for receiving a fastener therethrough.

Figure 7:
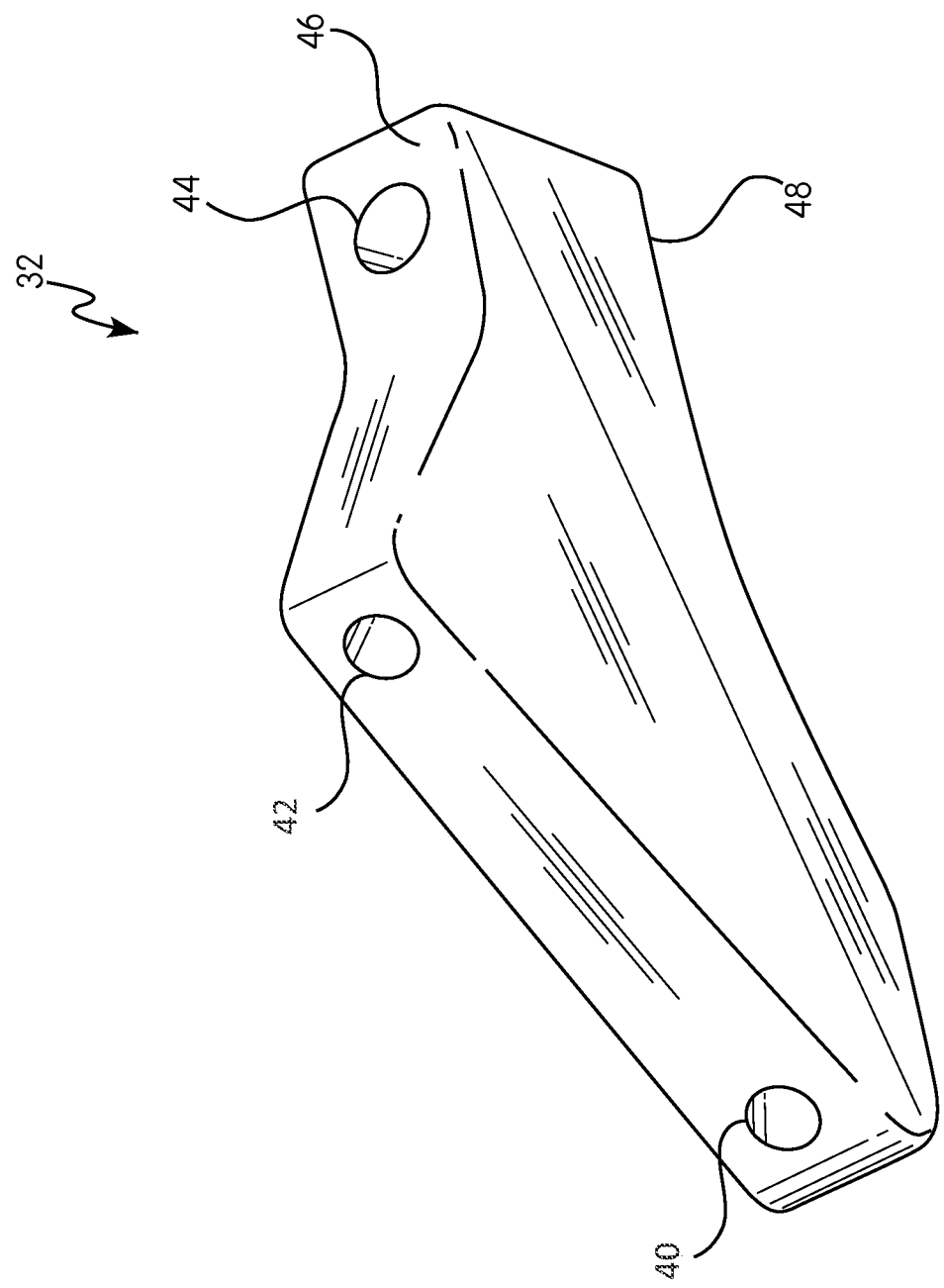
FIG. 7 is a top perspective view of a second clamping portion of the adjustable bracketing assembly of FIG. 5.

The second clamping portion 32 (FIG. 7) is preferably configured as shown having spaced apart apertures 40, 42 about its anterior portion. Specifically, the spaced apart apertures are positioned about an anterior face of the second clamping portion. The spaced apart apertures 40, 42 are spaced apart a distance greater than a height of the toolbar 20, and in line with the spaced apart apertures 34, 36 of the first clamping portion. Preferably, each spaced apart aperture 40, 42 are threaded apertures for receiving a threaded fastener e.g., fastener 38 therethrough.

The second clamping portion also includes a third aperture 44 about its posterior portion. The third aperture is preferably configured as a through hole for receiving a threaded fastener therethrough, but can alternatively be configured as a through hole having female threads. The third aperture also preferably extends in a longitudinal direction at an angle or nonparallel angle relative to a longitudinal direction of the first and second apertures 40, 42.

The posterior end of the second clamping portion 32 includes a substantially planar top surface 46 and a substantially planar bottom surface 48 opposite the top surface. The top and bottom surfaces 46, 48 are sized and configured to engage the mount 28, as further discussed below.

When the first and second clamping portions are connected together by fasteners 38, the bracket forms an opening 50 sufficiently sized to allow the passage of the toolbar 20 therethrough thereby being connecting to and supporting the toolbar.

The adjustable bracketing assembly 24 preferably includes at least two brackets 26, 26' (FIG. 3) each having an opening 50 to receive the toolbar therethrough. Alternatively, the adjustable bracketing assembly can include more than two, such as three, four or more brackets.

Figure 5:
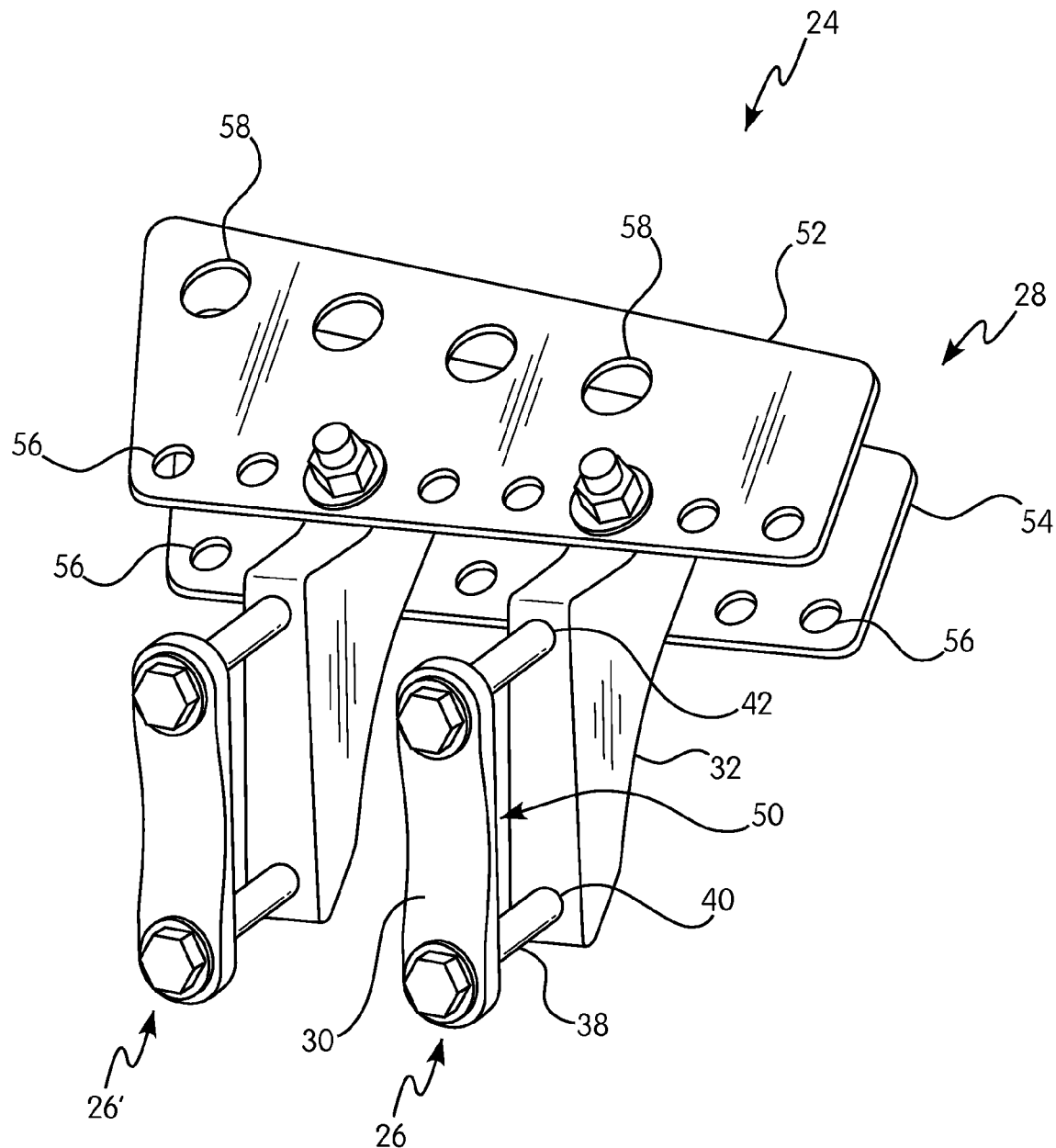
FIG. 5 is an enlarged top perspective view of the adjustable bracketing assembly of FIG. 3.
Figure 6:
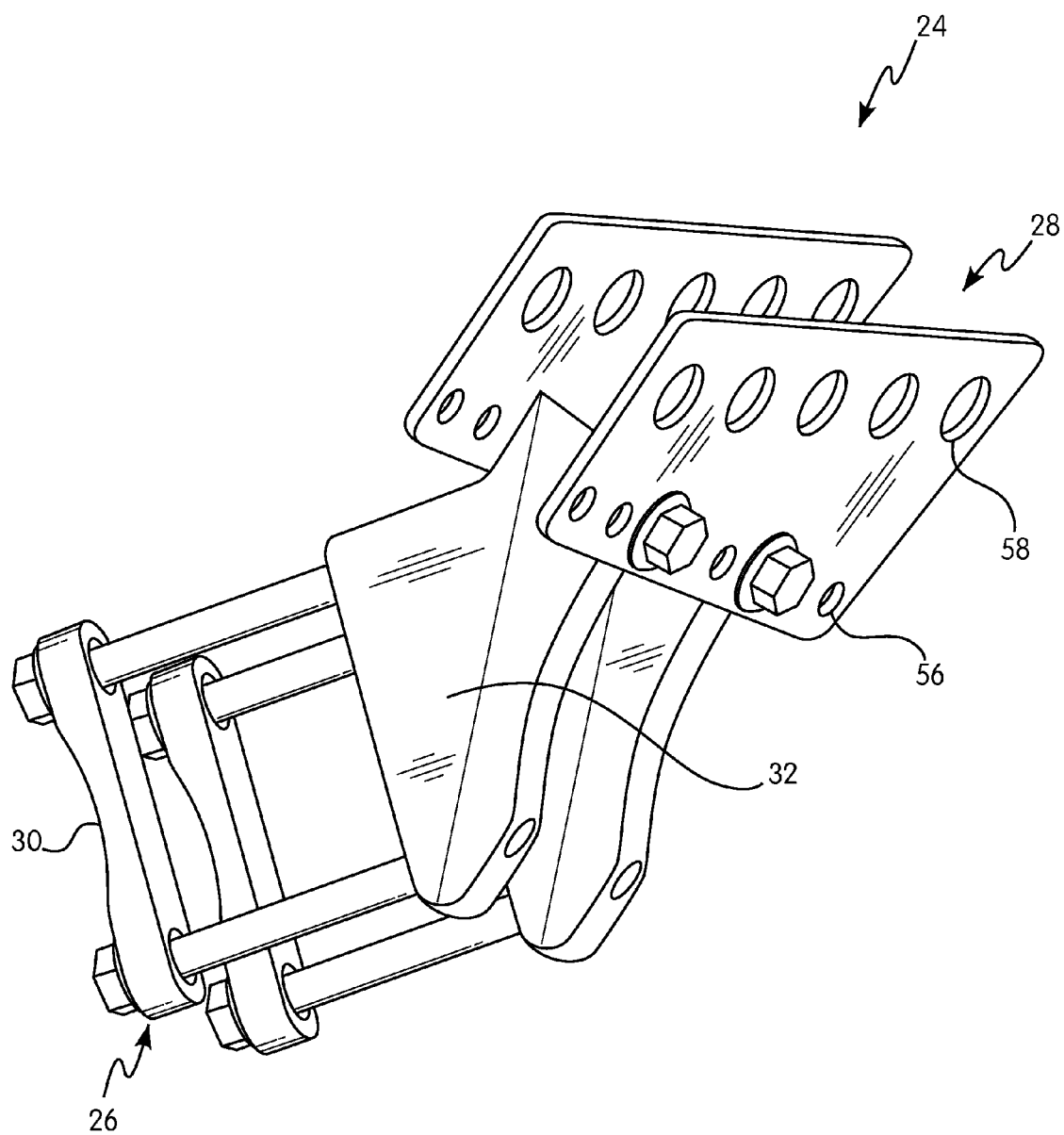
FIG. 6 is an enlarged bottom perspective view of the adjustable bracketing assembly of FIG. 3.

The mount 28 attaches to the brace and mounts the bracket thereto. The mount can be configured to be attachable to the brace about a plurality of positions along a longitudinal length of the brace. Preferably, the mount is fixedly attached to the brace about a distal end of the brace. The mount 28 is preferably configured as best shown in FIGS. 5 and 6, as an elongated mount that is attached to the second end of the brace. The elongated mount includes a plurality of mounting sites 56 that extend along an anterior portion or forward end of the mount. The plurality of mounting sites 56 is configured as a plurality of spaced apart apertures that extend along a forward end of the mount in a linear fashion in a widthwise direction of the header frame. The plurality of apertures 56 advantageously allows for the bracket 26 to be attachable to the mount 28 about a plurality of positions or mounting sites.

The mount 28 can be rigidly attached to the brace by appropriate fasteners, welding and the like. For example, the mount can include a plurality of apertures 58 for attaching the mount to the brace by fasteners (not shown). Owing to the construction of the plurality of apertures 58, mount 28 can be adjustably mounted to or welded to the brace about a plurality of positions along a longitudinal length of the brace 22.

In the embodiment illustrated in the figures, the mount is configured as a pair of plates 52, 54, i.e., a top plate 52 and a bottom plate 54. The bottom plate is spaced from the top plate and the two plates collectively form a mounting assembly to facilitate attachment of the bracket 26 to the brace 22. Each of the top and bottom plates 52, 54 can be rigidly attached to the brace by appropriate fasteners, welding, and the like.

Figure 3:
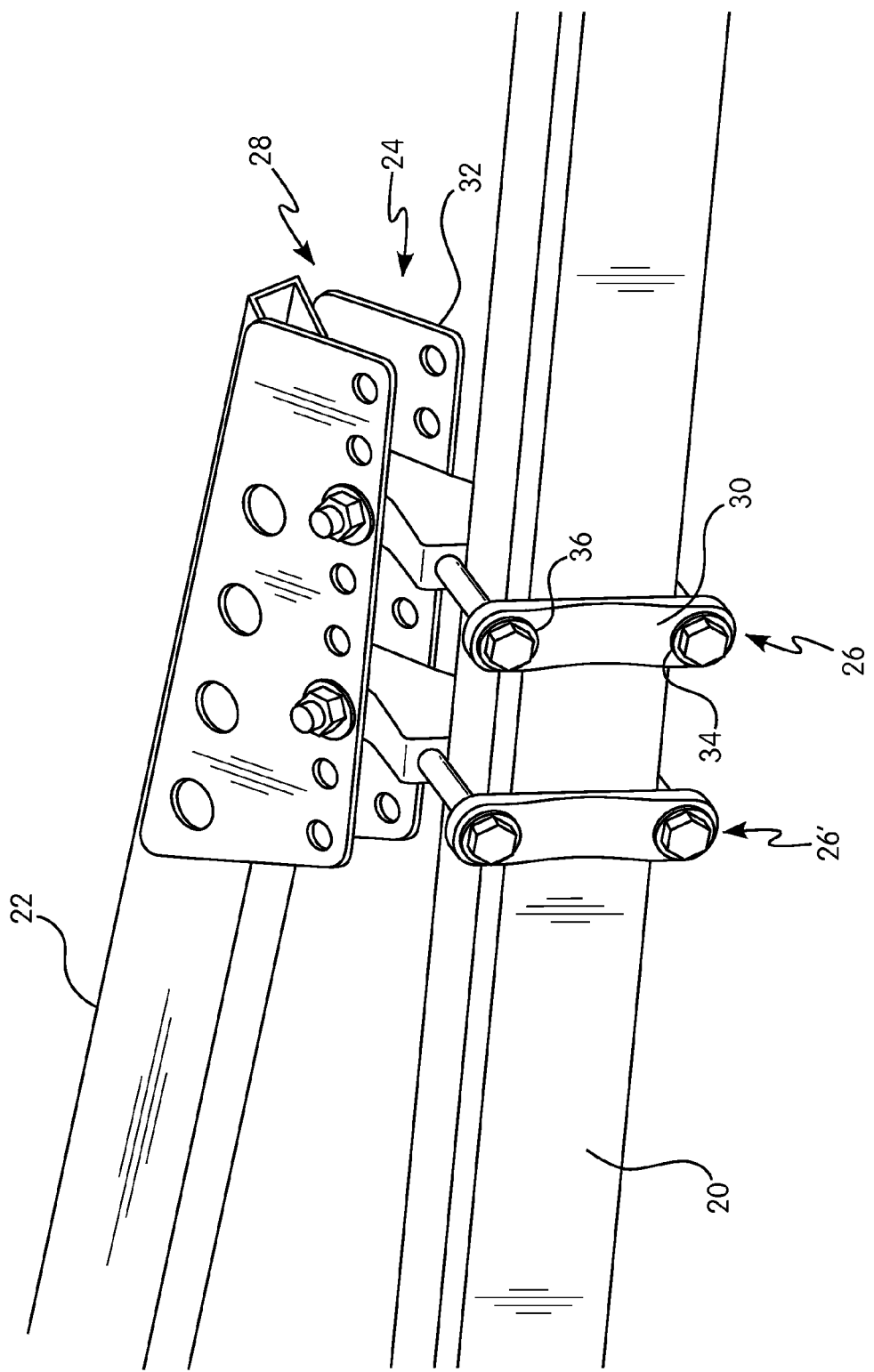
FIG. 3 is an enlarged partial top perspective view of an adjustable bracketing assembly of a header frame in accordance with a preferred embodiment of the present invention.
Figure 4:
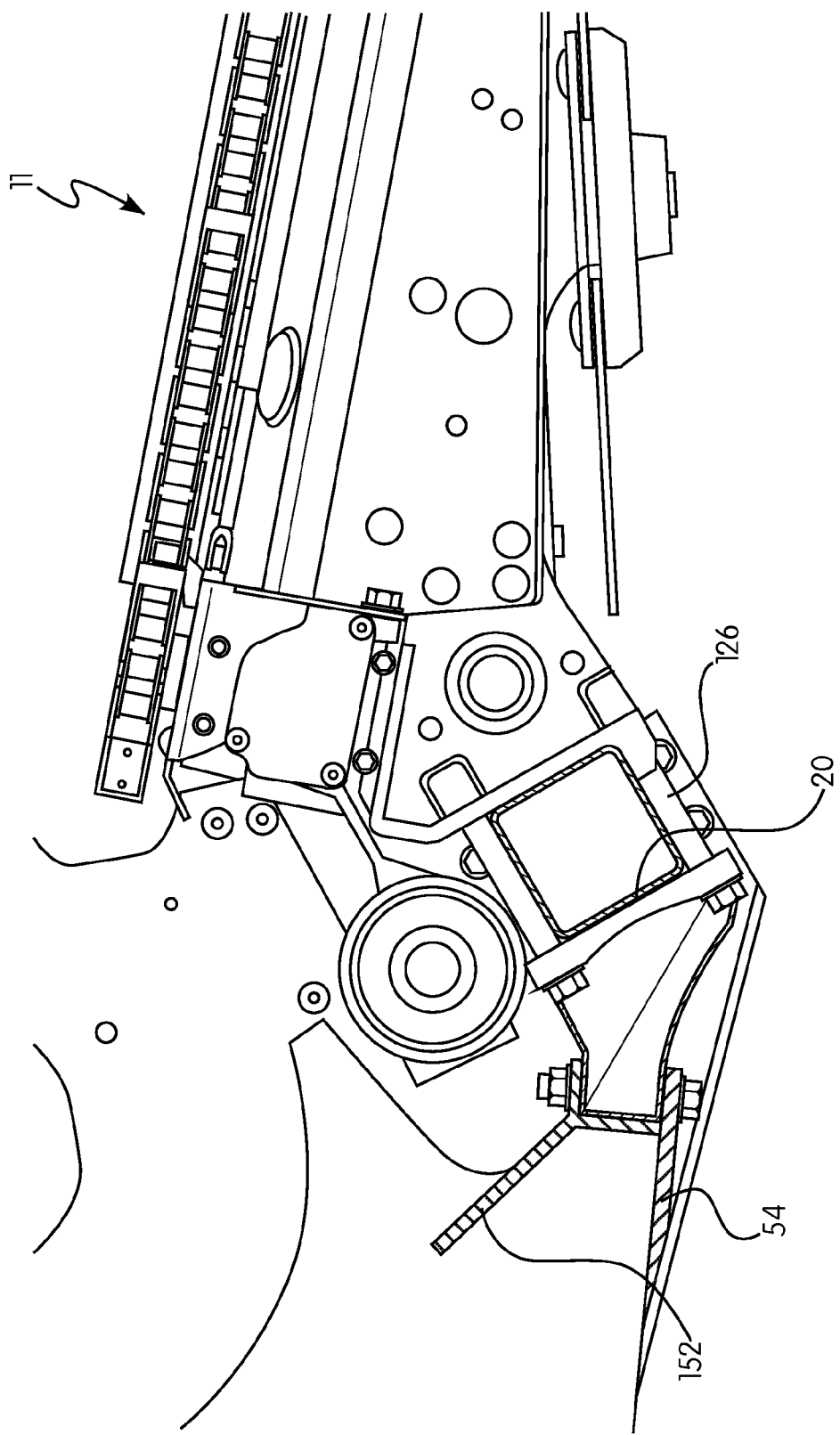
FIG. 4 is side cross-sectional view of the header frame of FIG. 1.

The top plate 52 is similarly shaped and sized as the bottom plate 54, but could alternatively be any other shape suitable for its intended purpose. As best shown in FIG. 3, the top plate is configured to mount to the brace 22 and attach to the top surface 46 of the second clamping portion 32. Correspondingly, the bottom plate 54 is configured to mount to the brace 22 about a bottom end of the brace and attach to the bottom surface of the second clamping portion 32.

Figure 8:
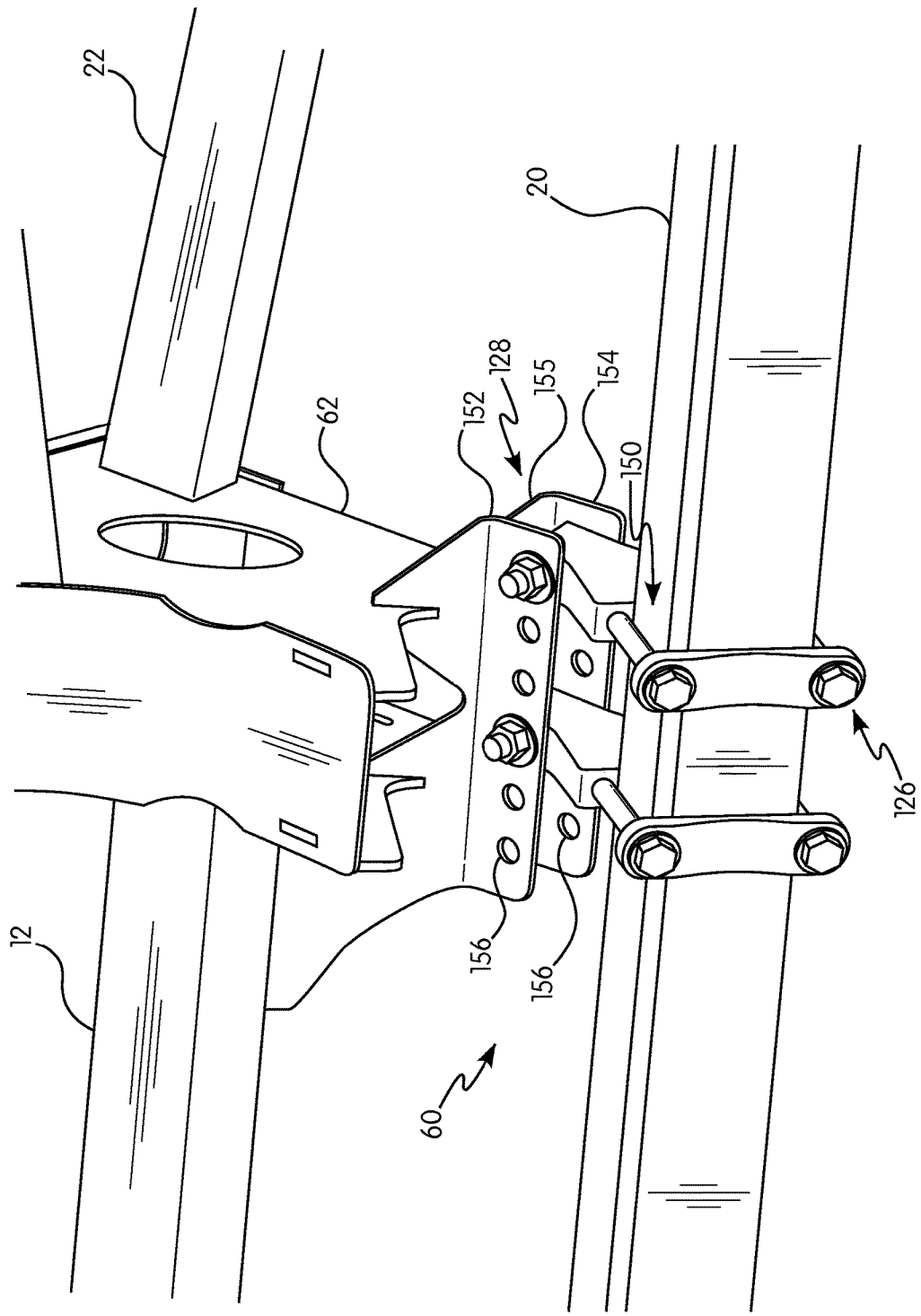
FIG. 8 is a top perspective view of a second adjustable bracketing assembly in accordance with another preferred embodiment of the present invention.

The header frame can further include a second adjustable bracketing assembly 60, as best shown in FIG. 8. The second adjustable bracketing assembly connects the toolbar 20 to the main frame 12. Specifically, the main frame includes a transverse frame member 62 extending forwardly of the main frame. The transverse frame member 62 can attach to the main frame in any desired position, but is preferably attached to the main frame adjacent the first end of the brace 22. Moreover, the first end of the brace can be directly attached to the main frame via the transverse frame member.

The second adjustable bracketing assembly 60 includes a second bracket 126 and a second mount 128. The second bracket 126 is similarly configured as bracket 26 described above for connecting to the toolbar 20, and is attachable to the second mount about a plurality of positions on the second mount. For example, the second bracket includes a first clamping portion and a second clamping portion for clamping onto and securing to the toolbar. The second bracket also includes an opening 150 through which the toolbar can pass through.

The second mount 128 is attached to the frame via the transfer frame member 62, and is preferably configured as shown in FIG. 8. The second mount is an elongated mount having a plurality of mounting sites. The second mount includes a top portion 152, a bottom portion 154 and a transverse member 155 extending between and connecting the top and bottom portions. The top portion is configured to attach to a top surface of the second clamping portion of the second bracket 126 while the bottom portion is configured to attach to a bottom surface of the second clamping portion. Further, a most posterior surface of the second clamping portion can be configured to seat in abutting engagement with the transverse member 155.

Similar to top plate 52, the top portion 152 includes a plurality of mounting sites. Preferably, the top portion includes a plurality of spaced apart apertures 156 that extend along a forward end of the top portion. Similarly, the bottom portion 154 is also configured to have a plurality of mounting sites, preferably configured as a plurality of spaced apart apertures 156. More particularly, the plurality of apertures extends along a forward end of the second mount in a linear fashion substantially parallel to a longitudinal direction of the toolbar. The plurality of spaced apart apertures along the top and bottom portions of the second mount allow for the second bracket 126 to attach to the second mount 128 by a fastener, for example a threaded screw or a nut and bolt. In other words, the second bracket is attachable to the second mount about a plurality of positions.

The second mount 128 can be attached to the main frame similar to how mount 28 is attached to the brace. For example, the second mount can attach to the main frame about a mid-portion of the main frame or the transverse frame member 62 via fasteners or by welding and the like.

In operation, the toolbar 20 is attached to the main frame 12 by the adjustable bracketing assemblies, as best shown in FIG. 1. For example, each adjustable bracketing assembly can be assembled such that the brackets are attached to their respective mounts. Then the toolbar 20 can be passed through the brackets, after which the bracket fasteners are secured to rigidly secure the toolbar to the mainframe. The toolbar can also have its lateral ends secured to respective sides of the main frame e.g., by fasteners, welding and the like.

Subsequently, when the need arises to adjust the position of the adjustable bracketing assemblies, the position of a respective bracket can be adjusted to another position along a length of the respective mount. For example, the bracket 26 can be moved to a neighboring position along the length of the mount 28, from the position defined by the sixth aperture from the left as shown in FIG. 5, to the position defined by the third aperture from the left shown in FIG. 5. This can be accomplished by removing fastener, repositioning the bracket and then reconnecting the bracket to the mount via the fastener.

It will be appreciated by those skilled in the art that changes could be made to the embodiments described above without departing from the broad inventive concept thereof. For example, alternative components and designs of the structure on the bracketing assembly can be used. It is to be understood, therefore, that this invention is not limited to the particular preferred embodiments disclosed, but it is intended to cover modifications within the spirit and scope of the present invention as defined by the appended claims.

I claim:

1. A header frame of an agricultural harvester, comprising:
a main frame;
first and second sides attached to respective lateral ends of the main frame;
a toolbar extending in a widthwise direction of the main frame;
a brace having a first end attached to the main frame and extending towards the toolbar; and
an adjustable bracketing assembly connecting the brace to the toolbar, the adjustable bracketing assembly including:
a mount attached to the brace, wherein the mount includes a plurality of apertures and a plurality of mounting sites spaced from the plurality of apertures, and
a bracket for connecting to the toolbar, wherein the bracket is attachable to the mount about the plurality of mounting sites.

2. The header frame of claim 1, the brace includes a second end opposite the first end, and wherein the mount is attached to the second end of the brace.

3. The header frame of claim 1, wherein the plurality of apertures extend along a forward end of the mount in a linear fashion and in a widthwise direction of the header frame.

4. The header frame of claim 1, wherein the mount comprises a top plate and a bottom plate spaced from the top plate.

5. The header frame of claim 1, wherein the mount includes a fastener for attaching to the brace about a plurality of positions along a longitudinal length of the brace.

6. The header frame of claim 1, wherein the bracket defines an opening to receive the toolbar therethrough.

7. The header frame of claim 1, wherein the adjustable bracketing assembly includes at least two brackets each having an opening to receive the toolbar therethrough.

8. The header frame of claim 1, wherein the first end of the brace is attached to a mid-portion of the main frame and the brace extends in a substantially lateral direction of the header.

9. The header frame of claim 1, further comprising a second adjustable bracketing assembly for connecting the toolbar to the main frame, the second adjustable bracketing assembly including:
a second bracket for connecting to the toolbar, and
a second mount attached to the frame, wherein the second bracket is attachable to the second mount about a plurality of positions.

10. The header frame of claim 9, wherein the second mount is attached to the frame about a mid-portion of the main frame.

11. The header frame of claim 9, wherein the second mount is an elongated mount having a plurality of mounting sites.

12. The header frame of claim 9, wherein the second mount is an elongated mount having a plurality of apertures for connection with the second bracket.

13. The header frame of claim 12, wherein the plurality of apertures extend along a forward end of the second mount in a linear fashion substantially parallel to a longitudinal direction of the toolbar.

14. The header frame of claim 1, wherein the mount is trapezoidal in shape and the plurality of apertures extend in a linear fashion in a direction that transverses a longitudinal axis of the tool bar.

15. The header frame of claim 4, wherein the brace is positioned between the top plate and the bottom plate.

16. The header frame of claim 1, wherein the bracket includes:
a first clamping portion; and
a second clamping portion operatively connected to the first clamping portion, wherein the second clamping portion includes an anterior end and a tapered posterior end for attaching to the mount.

17. The header frame of claim 1, wherein the mount includes a fastener for attaching to the bracket about a plurality of positions along a longitudinal length of the mount.

18. A header frame of an agricultural harvester, comprising:
a main frame;
first and second sides attached to respective lateral ends of the main frame;
a toolbar extending in a widthwise direction of the main frame;
a brace having a first end attached to a mid-portion of the main frame and extending towards the toolbar in a substantially lateral direction of the header; and
an adjustable bracketing assembly connecting the brace to the toolbar, the adjustable bracketing assembly including:
a bracket for connecting to the toolbar, and
a mount attached to the brace, wherein the bracket is attachable to the mount about a plurality of positions.

19. The header frame of claim 18, wherein the mount is a trapezoidal shaped mount including:
a plurality of mounting sites;
a plurality of apertures spaced from the plurality of mounting sites;
a first fastener for attaching to the brace about a plurality of positions along a longitudinal length of the brace; and
a second fastener for attaching to the bracket about a plurality of positions along a longitudinal length of the mount.

* * * * *